United States Patent
Watanabe

(10) Patent No.: US 10,223,824 B2
(45) Date of Patent: Mar. 5, 2019

(54) INFORMATION PROCESSING APPARATUS, SIMULATOR RESULT DISPLAY METHOD, AND COMPUTER-READABLE RECORDING MEDIUM

(71) Applicant: FUJITSU LIMITED, Kawasaki-shi, Kanagawa (JP)

(72) Inventor: Masahiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/610,694

(22) Filed: Jun. 1, 2017

(65) Prior Publication Data

US 2018/0012395 A1 Jan. 11, 2018

(30) Foreign Application Priority Data

Jul. 5, 2016 (JP) .................................. 2016-133443

(51) Int. Cl.
*G06T 15/04* (2011.01)
*G06T 19/20* (2011.01)

(52) U.S. Cl.
CPC .............. *G06T 15/04* (2013.01); *G06T 19/20* (2013.01); *G06T 2219/2016* (2013.01)

(58) Field of Classification Search
None
See application file for complete search history.

(56) References Cited

U.S. PATENT DOCUMENTS

2005/0168460 A1* 8/2005 Razdan ............. G06F 17/30398
345/419
2014/0184590 A1  7/2014 Watanabe et al.

FOREIGN PATENT DOCUMENTS

| JP | H11-066277 | 3/1999 |
|---|---|---|
| JP | H11-104072 | 4/1999 |
| WO | 2013/038548 | 3/2013 |

OTHER PUBLICATIONS

D. Matsuoka et al., "Survey on Scientific Data Visualization for Large-scale Simulations", JAMSTEC, Rep. Res Dev., vol. 13, pp. 35 to 63, Sep. 2011 (30 pages).

M. Kaneko et al., "DAFM: Program for Automatic Generation of Three Dimensional Unstructured Grid", Program Usage Manual of Large Computer Center of Nagoya University, pp. 1 to 53, Mar. 17, 2000 (54 pages).

M. Kinishi et al., "Analysis of Centerline Extraction in Three—Dimensional Scale Space—Extracting Centerline of Vessels in Hepatic Artery", 2009 Fifth International Conference on Natural Computation, pp. 3 to 7, Aug. 2009 (5 pages).

* cited by examiner

*Primary Examiner* — Kee M Tung
*Assistant Examiner* — Yanna Wu
(74) *Attorney, Agent, or Firm* — Fujitsu Patent Center

(57) ABSTRACT

An information processing apparatus is disclosed. A processor selects cross-section shape information and texture information corresponding to a view direction from a memory. The memory stores the cross-section shape information representing a cross-section shape and the texture information representing a texture of a cross-section for each of cross-sections in a vicinity of a line segment pertinent to a phenomenon portion. The processor generates visualization data used to visualize the line segment in a three dimensional image by using the cross-section shape information and the texture information being selected and displays the line segment based on the visualization data on a display part.

5 Claims, 14 Drawing Sheets

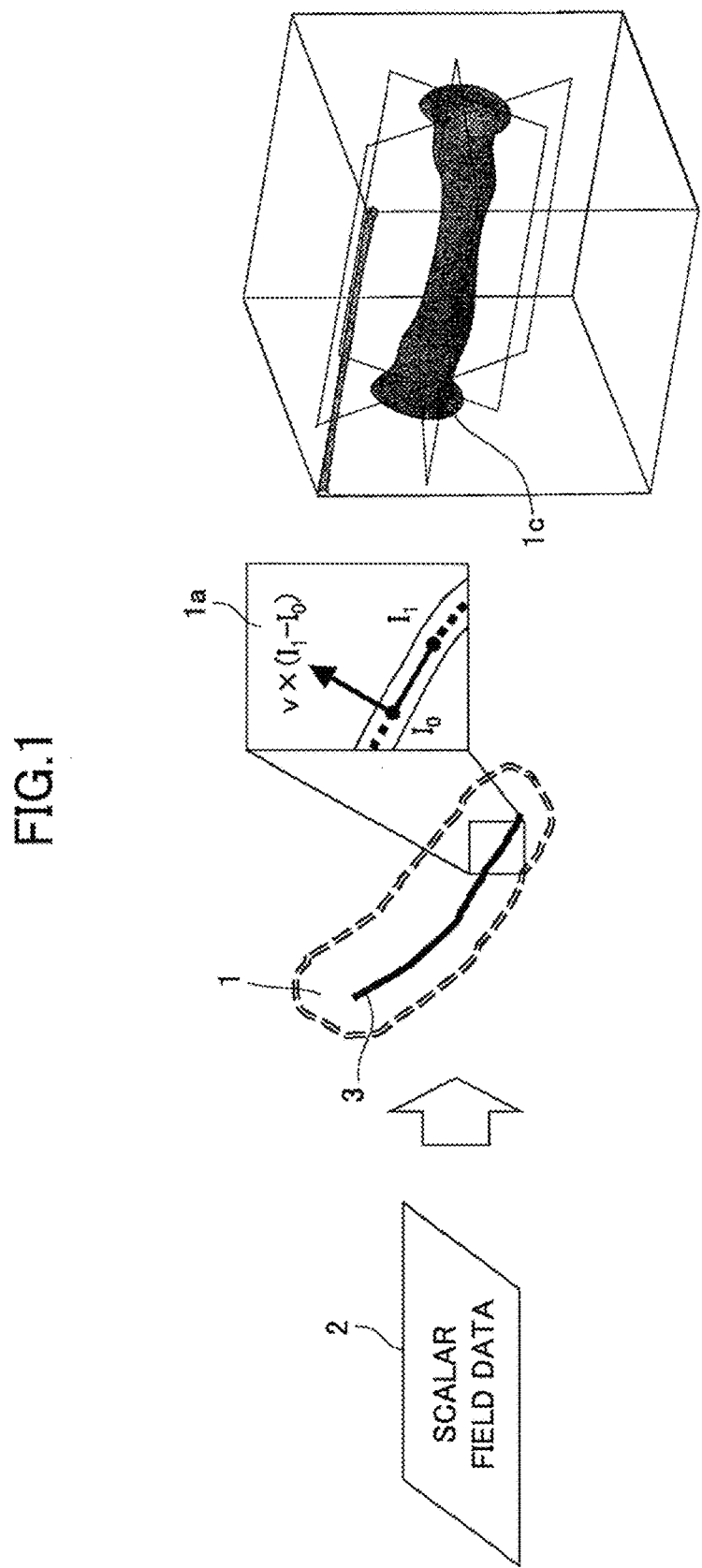

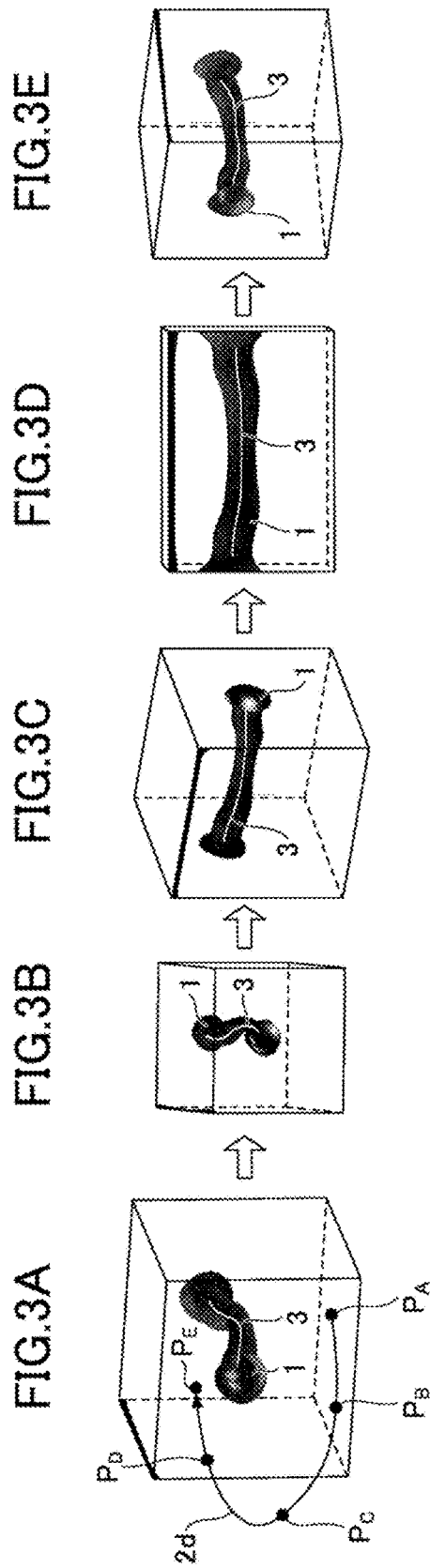

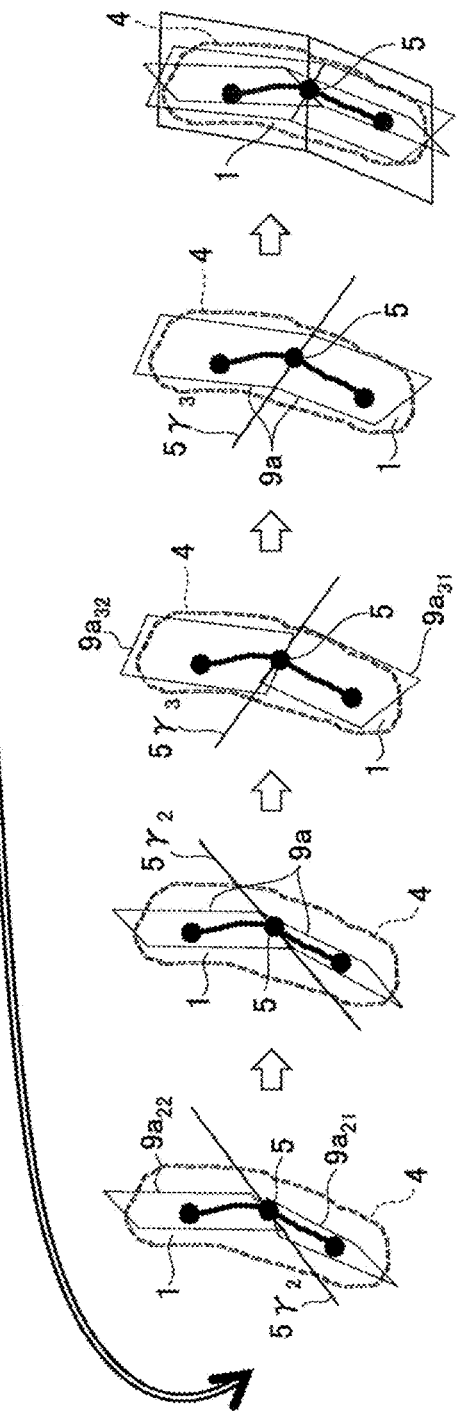

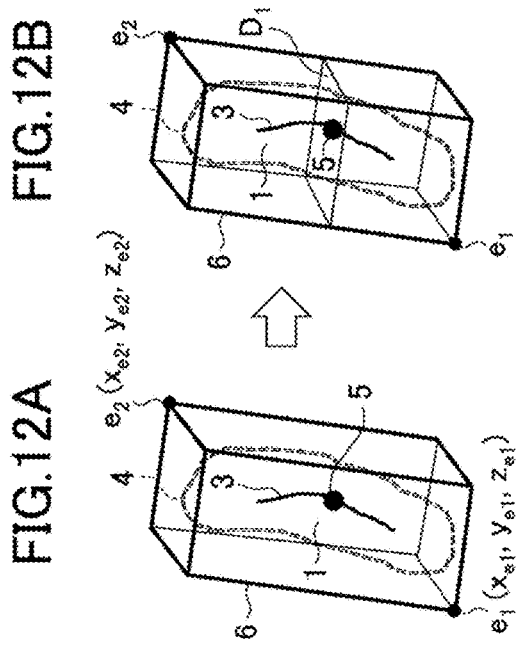
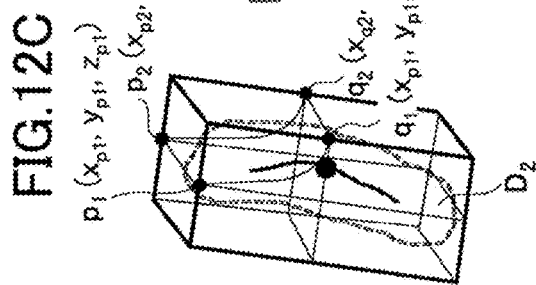
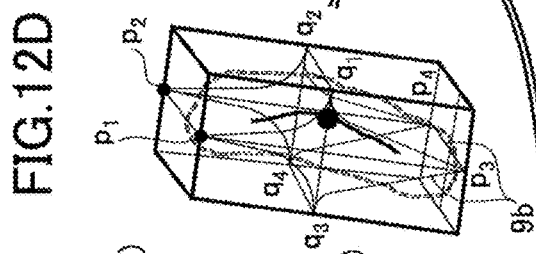
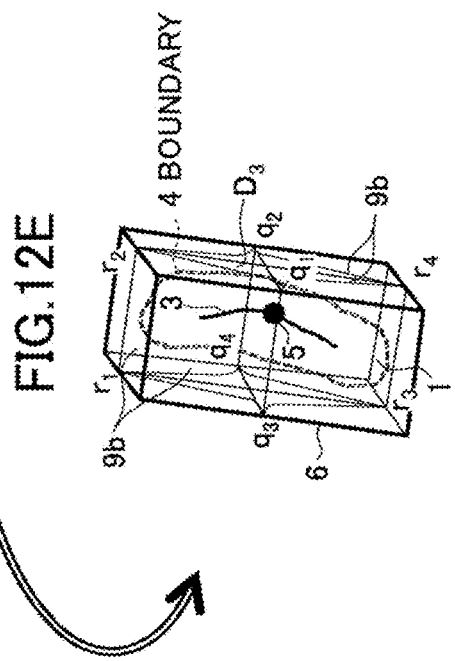

INFORMATION PROCESSING APPARATUS, SIMULATOR RESULT DISPLAY METHOD, AND COMPUTER-READABLE RECORDING MEDIUM

CROSS-REFERENCE TO RELATED APPLICATIONS

This application is based upon and claims the benefit of priority of the prior Japanese Patent Application No. 2016-133443, filed on Jul. 5, 2016, the entire contents of which are incorporated herein by reference.

FIELD

The embodiments discussed herein are related to an information processing apparatus, a simulator result display method and a computer-readable recording medium having stored therein a simulator result display program.

BACKGROUND

In recent year, reproduction and prediction of phenomena are carried out by numerical simulation performed by a computer. After the numerical simulation, a visualization process is performed, since it is difficult to directly comprehend the phenomena from the numerical data. For the visualization, a three-dimensional visualization using a technology of computer graphics, and visualization of a time change by a motion picture are generally conducted.

However, a result of simulation by a large scale computational process using a super computer is output with an extraordinary large amount of data exceeding a data size of a petabyte order. For such data, numerous studies on visualization methods have been conducted.

Several technologies are presented. One technology presents to create a scaler field from large scale data and to visualize by a scheme such as a direct volume rendering. Another technology presents to generate a quadrilateral at every nodal point of streamline formed along a velocity vector of a fluid molecule for each of points at a certain moment and to conduct a texture mapping onto polygons on each of the quadrilaterals.

Patent Documents

[Patent Document 1]
International Publication Pamphlet No. WO2013/038548
[Patent Document 2]
Japanese Laid-open Patent Publication No. 11-104072
[Patent Document 3]
Japanese Laid-open Patent Publication No. 11-066277

Non-Patent Documents

[Non-Patent Document 1]
Daisuke Matsuoka and Fumiaki Araki, "Survey on Scientific Data Visualization for Large-scale Simulations", JAMSTEC, Rep. Res. Dev., Volume 13, September 2011
[Non-Patent Document 2]
Munetsugu Kaneko et al., "DAFM: Program for Automatic Generation of Three Dimensional Unstructured Grid", Program Usage Manual of Large Computer Center of Nagoya University, pp. 1 to 53, 17 Mar. 2000
[Non-Patent Document 3]
Motoi Kinishi et al., "Analysis of Centerline Extraction in Three-Dimensional Scale Space-Extracting Centerline of Vessels in Hepatic Artery", 2009 Fifth International Conference on Natural Computation, pp. 3 to 7, August 2009

SUMMARY

According to one aspect of the embodiments, an authentication apparatus includes a memory; and a processor coupled to the memory and the processor configured to select cross-section shape information and texture information corresponding to a view direction from the memory, the memory storing the cross-section shape information representing a cross-section shape and the texture information representing a texture of a cross-section for each of cross-sections in a vicinity of a line segment pertinent to a phenomenon portion; and generate visualization data used to visualize the line segment in a three dimensional image by using the cross-section shape information and the texture information being selected, and display the line segment based on the visualization data on a display part.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram for explaining a process example from feature extraction to visualization;

FIG. 3A through FIG. 3E are diagrams for explaining a display change example of a phenomenon region based on a plane selection depending on a camera position;

FIG. 11A through FIG. 11I are diagrams for explaining a process example of the first cross-section formation method;

FIG. 12A through FIG. 12E are diagrams for explaining a process example of the second cross-section formation method;

DESCRIPTION OF EMBODIMENTS

For the above described technologies, in order to realize bird's eye visualization, reduction of a data size is an important issue. In general, thinning of grid information is performed. In this case, a display is not realized with analysis accuracy of large-scale simulation itself.

Accordingly, the embodiment presents to properly extract sufficient data for a visualization process of a simulation result.

In the following, a preferred embodiment of the present invention will be described with reference to the accompanying drawings. FIG. 1 is a diagram for explaining a process example from feature extraction to visualization. In FIG. 1, an example of a visualization process using scalar field data 2 created from large scale data acquired by numerical simulation will be described.

First, a center line 3 of a phenomenon region 1 representing a phenomenon from the scaler field data 2 is acquired, nodal points $I_0, I_1, \ldots$ are applied on the center line 3, and a vector is calculated on each of nodal points $I_k$ (k=0, 1, ...) such as a vector $v \times (I_0 - I_1)$ (1a). Torsion information is generated by using respective vectors acquired for the nodal points $I_k$, and a curved surface 1c is visualized by using the generated torsion information. An example of a three dimensional visualization will be depicted in FIG. 2A through FIG. 2C.

Figure 2C:
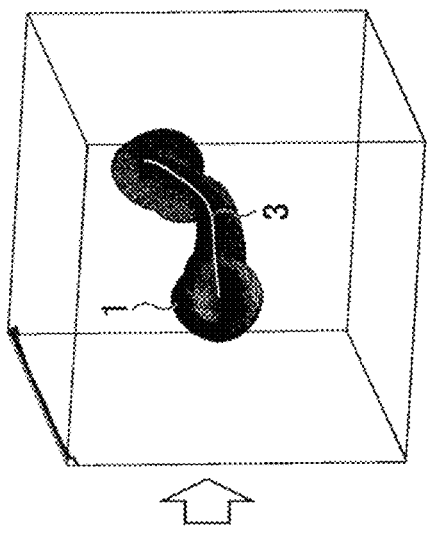
FIG. 2A through FIG. 2C are diagrams illustrating an example of a three dimensional visualization.
Figure 2B:
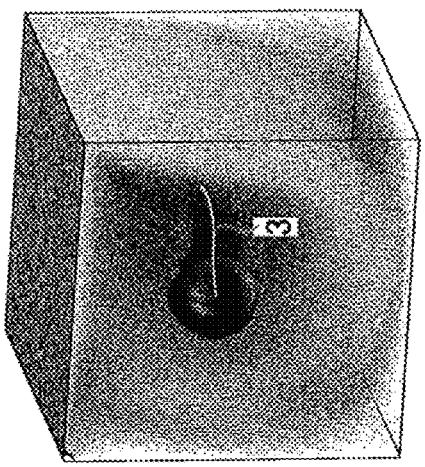
Figure 2A:
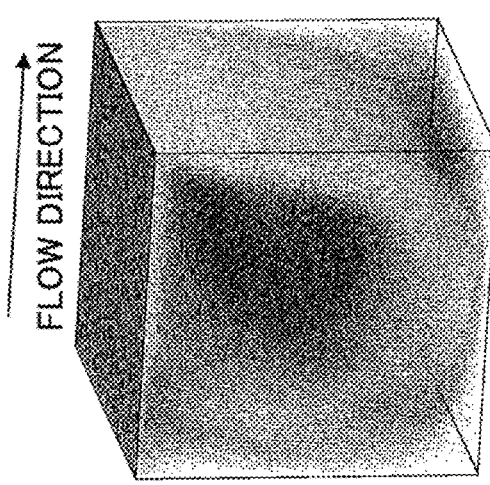

FIG. 2A through FIG. 2C are diagrams illustrating the example of the three dimensional visualization. A result acquired by simulation is illustrated. In FIG. 2A, a cavity flow direction is indicated by an arrow. In FIG. 2B, an example of the phenomenon region 1 extracted from the scalar field data 2 acquired by the numeric simulation is illustrated. The phenomenon region 1 may be represented such as the curved surface 1c in FIG. 1. FIG. 2C depicts an example of the three dimensional visualization depending on a camera position with respect to the phenomenon region 1.

FIG. 3A through FIG. 3E are diagrams for explaining a display change example of the phenomenon region based on a plane selection depending on the camera position. Based on the camera position and the vectors respective to the nodal points $I_k$, the three visualization is formed by forming a plane including two nodal points $I_k$ adjacent to each other on the center line 3, and by sharing an edge at an adjacent side among planes.

FIG. 3A illustrates an example of the phenomenon region 1 rendered on the plane selected depending on a camera position $P_A$. In accordance with a camera movement direction 2d representing a gaze point illustrated in FIG. 3A, a display example of the phenomenon region 1, which has been changing, will be described with reference to FIG. 3B through FIG. 3E.

FIG. 3B illustrates an example of the phenomenon region 1 rendered on the plane selected depending on the camera position $P_B$. FIG. 3C illustrates an example of the phenomenon region 1 rendered on the plane selected depending on the camera position $P_C$. FIG. 3D illustrates an example of the phenomenon region 1 rendered on the plane selected depending on the camera position $P_D$. FIG. 3E illustrates an example of the phenomenon region 1 rendered on the plane selected depending on the camera position $P_E$.

As a phenomenon to be visualized, pressure, air flow, and the like being unshaped are considered. However, the embodiment is not limited to these phenomena, and is able to visualize various phenomenon regions 1 in three dimensions.

Figure 4:
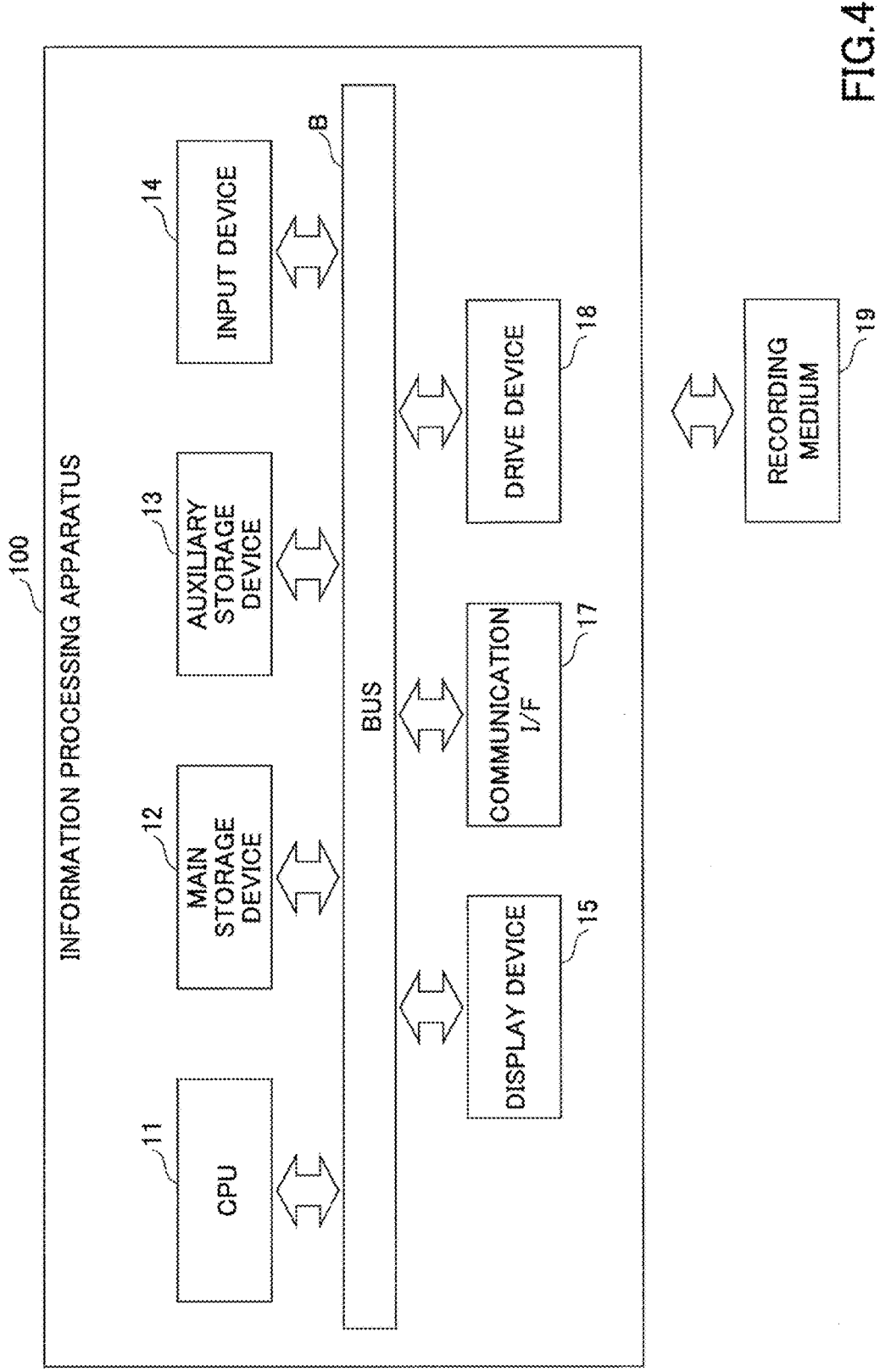
FIG. 4 is a diagram illustrating a hardware configuration of an information processing apparatus.

The three dimension visualization in the embodiment is conducted by an information processing apparatus 100 as illustrated in FIG. 4. FIG. 4 is a diagram illustrating a hardware configuration of the information processing apparatus. In FIG. 4, the information processing apparatus 100 is controlled by a computer, and includes a Central Processing Unit (CPU) 11, a main storage device 12, an auxiliary storage device 13, an input device 14, a display device 15, a communication InterFace (I/F) 17, and a drive device 18, which are mutually connected by a bus B.

The CPU 11 corresponds to a processor that controls the information processing apparatus 100 in accordance with a program stored in the main storage device 12. A Random Access Memory (RAM), a Read Only Memory (ROM), and the like may be used as the main storage device 12 to store or temporarily store the program executed by the CPU 11, data for a process conducted by the CPU 11, data acquired in the process conducted by the CPU 11, and the like.

A Hard Disk Drive (HDD) or the like may be used as the auxiliary storage device 13, and stores various sets of data such as programs for performing various processes and the like. A part of the program stored in the auxiliary storage device 13 is loaded to the main storage device 12, and various processes are performed and realized by the CPU 11.

The input device 14 includes a mouse, a keyboard, and the like, and is used by a user to input various information items for the process conducted by the information processing apparatus 100. The display device 15 displays various information items for control of the CPU 11. The input device 12 and the display device 15 may be integrated as a user interface such as a touch panel or the like. The communication I/F 17 conducts wired or wireless communications through a network. The communications by the communication I/F 17 are not limited as wireless or wired.

The program realizing the processes conducted by the information processing apparatus 100 may be provided to the information processing apparatus 100 by a recording medium 19 such as a Compact Disc Read-Only Memory (CD-ROM) or the like, for instance.

The drive device 18 interfaces between the recording medium 19 (the CD-ROM or the like) set into the drive device 18 and the information processing apparatus 100.

Also, the program, which realizes the various processes according to the embodiment, is stored in the recording medium 19. The program stored in the recording medium 19 is installed into the information processing apparatus 100 through the drive device 18, and becomes executable by the information processing apparatus 100.

The recording medium 19 storing the program is not limited to the CD-ROM. The recording medium 19 may be any type of a recording medium, which is a non-transitory tangible computer-readable medium including a data structure. The recording medium 19 may be a portable recording medium such as a Digital Versatile Disc (DVD), a Universal Serial Bus (USB) memory, or the like, or a semiconductor memory such as a flash memory.

Figure 5:
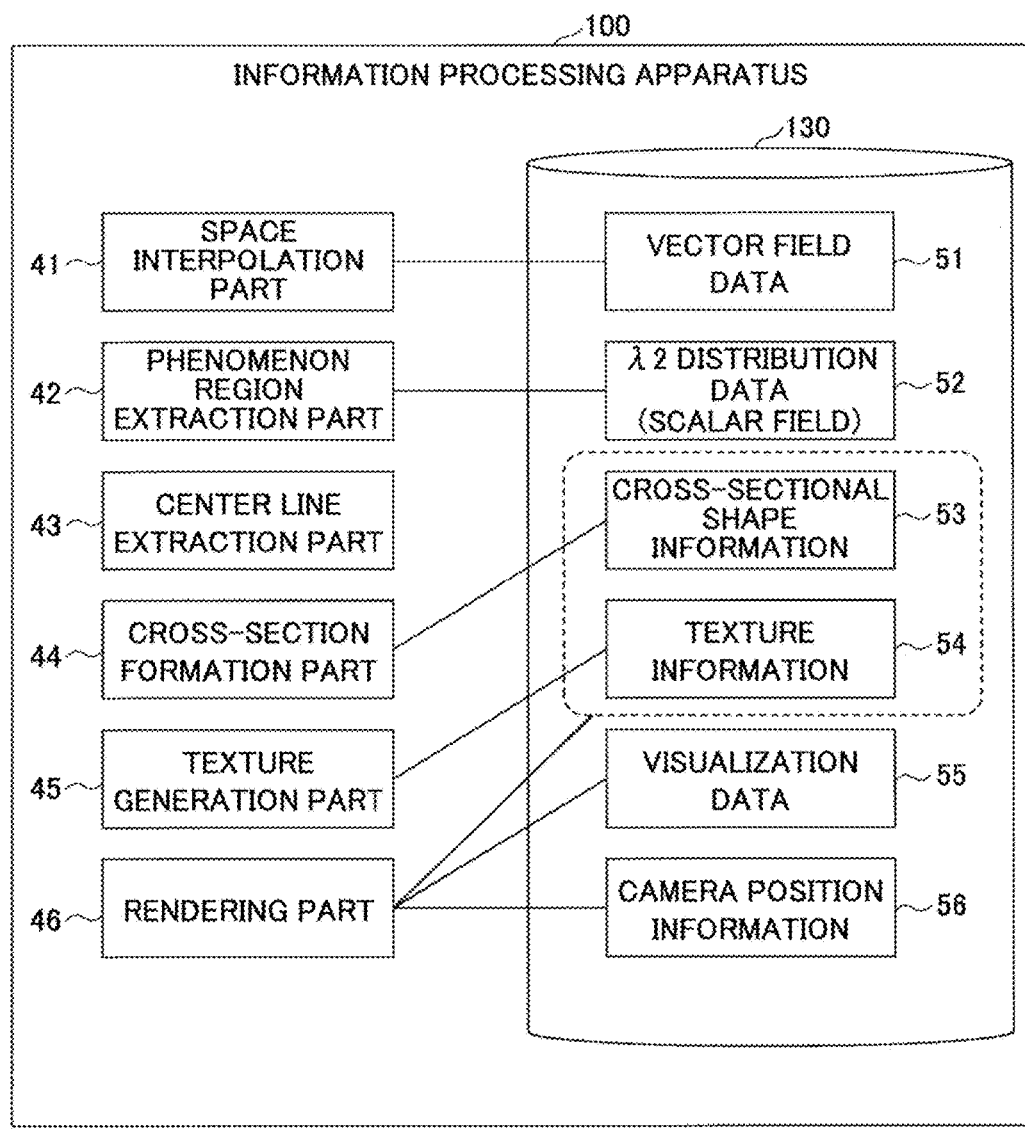
FIG. 5 is a diagram illustrating a functional configuration example of the information processing apparatus in the embodiment.

FIG. 5 is a diagram illustrating a functional configuration example of the information processing apparatus in the embodiment. In FIG. 5, the information processing apparatus 100 includes a space interpolation part 41, a phenomenon region extraction part 42, a center line extraction part 43, a cross-section formation part 44, a texture generation part 45, and a rendering part 46. Each of the space interpolation part 41, the phenomenon region extraction part 42, the center line extraction part 43, the cross-section formation part 44, the texture generation part 45, and the rendering part 46 is realized by a process, which a corresponding program causes the CPU 11 to execute.

Also, a storage part 130, which corresponds to the main storage device 12 and the auxiliary storage device 13, stores vector field data 51, a λ2 distribution data 52 of the scaler field, cross-sectional shape information 53, texture information 54, visualization data 55, camera position information 59, and the like.

The space interpolation part 41 includes the entire computational space 7 (FIG. 6) based on the vector field data 51, and conducts a space interpolation process in a form of a structural grid. The vector field data 51 may be any one of the structural grid and an unstructured grid, or may be a mix thereof. The computational space 7 (FIG. 6) is regarded as an Euclidean space.

When the vector field data 51 is data of the structural grid, the space interpolation process is not conducted. In the vector field data 51, with respect to data of the unstructured grid, the space interpolation process is conducted by the space interpolation part 41.

The phenomenon region extraction part 42 uses a $\lambda 2$ method of Jing et al., and extracts the phenomenon region 1 (which may be a vortex region or a vascular region). The $\lambda 2$ distribution data 52 by the scaler field acquired by the $\lambda 2$ method are specified by a boundary 4 (FIG. 6) of the phenomenon region 1. The extraction of the phenomenon region 1 includes to distinguish between the vortex region and a non-vortex region, and to distinguish between the vascular region and a non-vascular region. The $\lambda 2$ distribution data 52 by the scalar field are output to the storage part 130.

The center line extraction part 43 extracts the center line 3 of a region extracted by the phenomenon region extraction part 42.

The cross-section formation part 44 conducts a cross-section formation process with respect to the region extracted based on the center line 3. The cross-sectional shape information 53 is stored in the storage part 130. The cross-sectional shape information 53 includes information pertinent to multiple cross-sectional shapes.

The cross-section formation part 44 in the embodiment conducts a first cross-section formation method or a second cross-section formation method described below, depending on a selection of the user.

First Cross-Section Formation Method

For each of ends of the center line 3, multiple planes including the edge and the region center 5 (FIG. 6) of the center line 3 are generated, and the cross-section formation process is conducted for each of the multiple planes.

Second Cross-Section Formation Method

Maximum and minimum space information is defined for the extracted region. The curved surface is generated by using center point information acquired from the space information, and the cross-section formation process is conducted. The space information represents a three-dimensional rectangular region such as a cube, a rectangular solid, or the like. Hereinafter, it is simply called "rectangular region".

The texture generation part 45 uses the cross-sectional shape information 53 and generates texture depending on each of cross-sectional shapes. The texture information 54 is output and stored in the storage part 130. The texture information 54 is regarded as information such as the texture, or the like, which represents reflected light of a band surface for a light source arranged at a predetermined position in a three dimensional space.

The rendering part 46 includes a selection part for selecting the cross-sectional shape information 53 and the texture information 54 depending on the camera position information 59 from the storage part 130, and a display part for generating the visualization data 55 in the storage part 130 and displaying the visualization data 55 on the display device 15.

Figure 6:
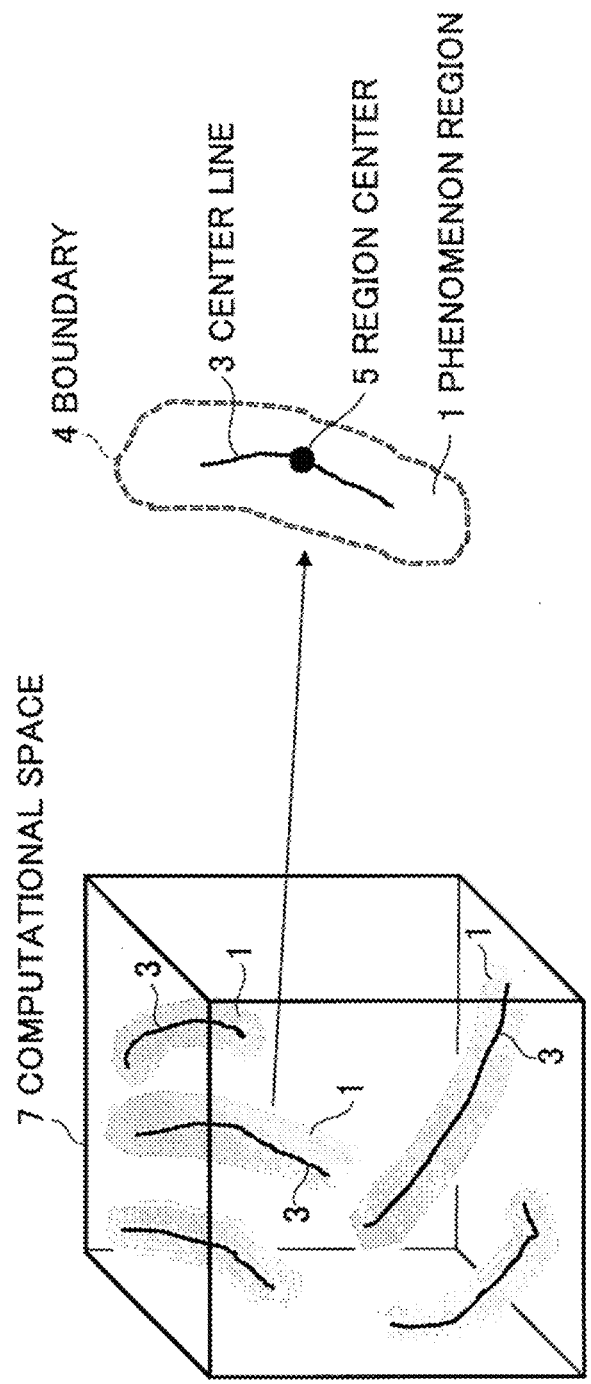
FIG. 6 is a diagram illustrating an example of a region extracted from a computational space.

FIG. 6 is a diagram illustrating an example of the region extracted from the computational space. Referring to FIG. 6, in the computational space 7 after the space interpolation process, examples of the extracted phenomenon regions 1 are depicted. By extracting the center line 3 from each of the extracted phenomenon regions 1, and by further specifying a center of the extracted center line 3, the region center 5 is defined. In FIG. 6, the extracted phenomenon region 1 is depicted by the boundary 4, and is depicted in the same manner in the following.

For each of the extracted regions, the first cross-section formation method or the second cross-section formation method is conducted. The first cross-section formation method and the second cross-section formation method 2 will be described.

Figure 7A:
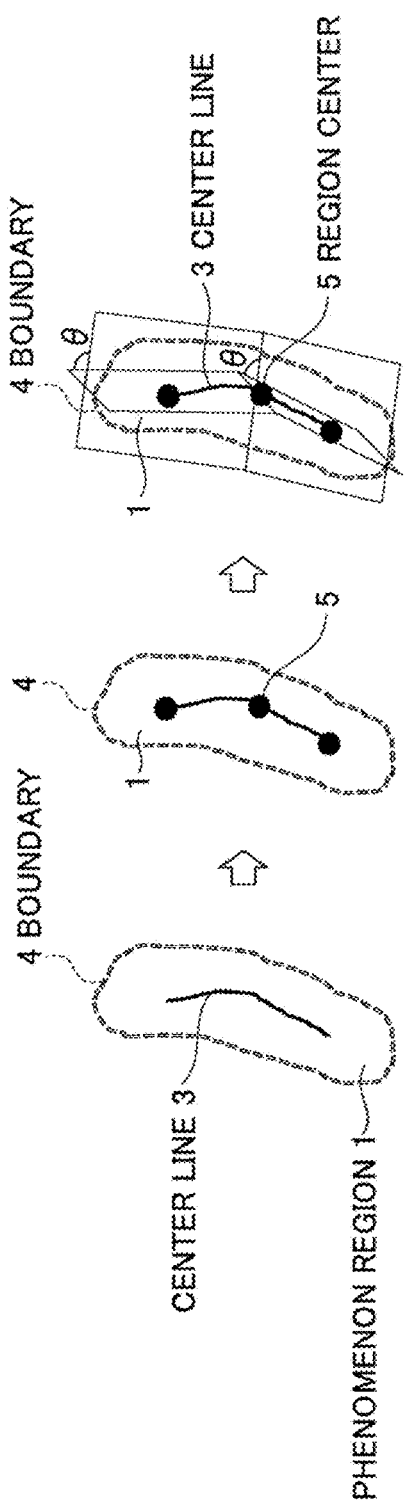
FIG. 7A and FIG. 7B are diagrams for briefly explaining cross-section formation methods in the embodiment.
Figure 7B:
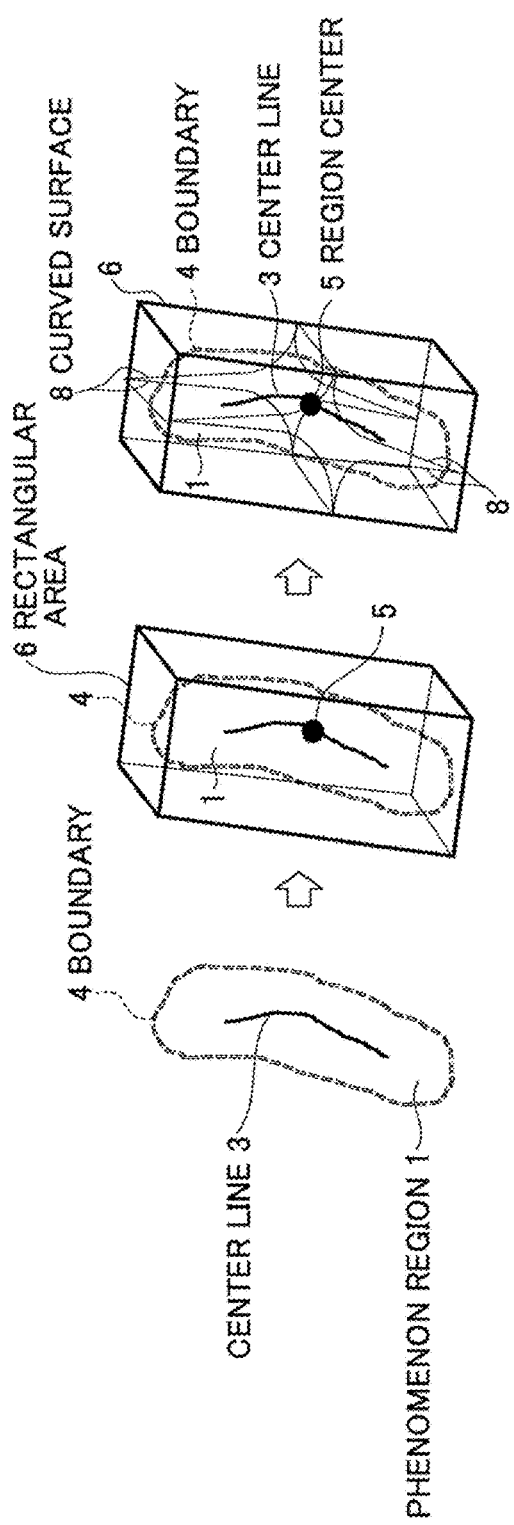

FIG. 7A and FIG. 7B are diagrams for briefly explaining the cross-section formation methods in the embodiment. FIG. 7A depicts the first cross-section formation method for indicating the plane by a curvature determination based on the center line 3. In the first cross-section formation method, a center of the center line 3 extracted from the region is acquired and defined as the region center 5.

The cross-section formation process is conducted by setting a pair of planes: a first plane and a second plane. The first plane and the second plane share one edge including the region center 5 with each other. The first plane includes one end point of the center line 3 and the region center 5. The second plane includes another end point of the center line 3 and the region center 5. By a different angle θ, a plurality of pairs of planes sharing the edge including the region center 5 may be created. In this example, θ=90° is applied. however, any angle θ is applicable.

FIG. 7B illustrates the second cross-section formation method for setting the maximum and minimum space information of the extracted region, and generating the curved surface by using middle point information acquired from the maximum and minimum space information. Similar to the first cross-section formation method, the region center 5 of the phenomenon region 1 is set. Moreover, a rectangular region 6 is determined to be a minimal region to include a three dimensional shape of the phenomenon region 1 estimated based on the boundary 4.

A curved line 8 is defined by using a central point of each of edges of the rectangular region 6, and the curved surface is generated by a plurality of defined curved lines 8.

Figure 8:
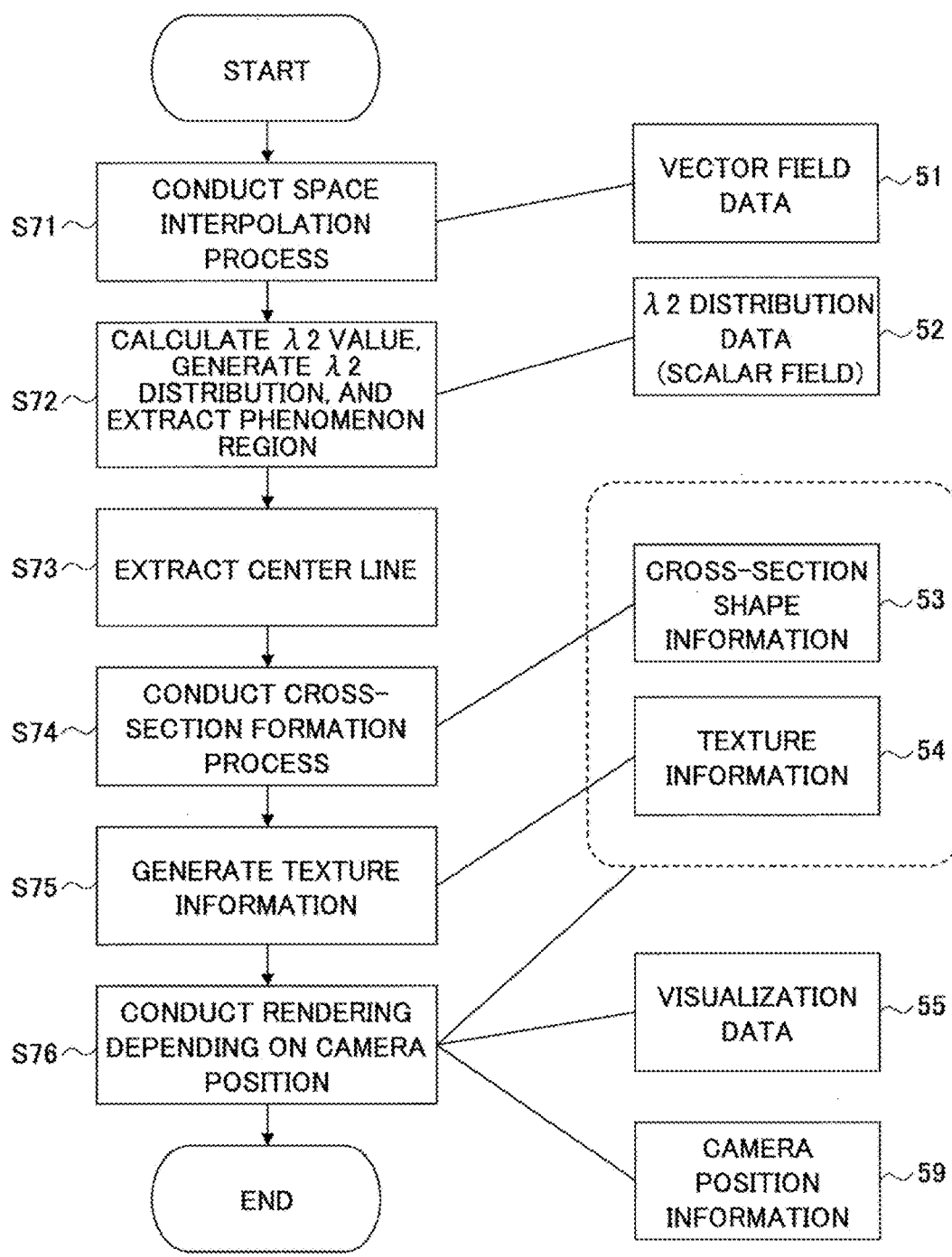
FIG. 8 is a flowchart for explaining a three dimensional visualization process in the embodiment.

FIG. 8 is a flowchart for explaining a three dimensional visualization process in the embodiment. Referring to FIG. 8, the space interpolation part 41 conducts the space interpolation process by using the vector field data 51 pertinent to the phenomenon region 1 in the computational space 7 (step S71). The space interpolation process is performed for the unstructured grid.

The phenomenon region extraction part 42 generates the $\lambda 2$ distribution data 52 by calculating a $\lambda 2$ value distribution of the computational space 7, and extracts the phenomenon region 1 (step S72). By extracting the phenomenon region 1, at least the boundary 4 is extracted. Then, the center line extraction part 43 extracts the boundary 4 and the center line 3 from the computational space 7 based on the $\lambda 2$ distribution data 52 (step S73).

Next, the cross-section formation part 44 conducts the cross-section formation process based on the boundary 4 and the center line 3, which are extracted by the center line extraction part 43, by the first or second cross-section formation method indicated by the user (step S74). The cross-sectional shape information 53 is output.

Next, the texture generation part 45 generates the texture for each of the cross-sectional shapes with respect to each of the regions specified by the boundary 4 based on the cross-sectional shape information 53, and generates the texture information 54 representing the texture (step S75).

The rendering part 46 creates the visualization data 55 based on the camera position information 59 by using the cross-sectional shape information 53 and the texture information 54 (step S76). Based on the visualization data 55, a three dimensional image or motion picture is displayed on the display device 15.

The space interpolation process by the space interpolation part 41 will be described below. The space interpolation part 41 inputs the vector field data 51 for the structural grid, the unstructured grid, or the mix thereof are input.

Figure 9B:
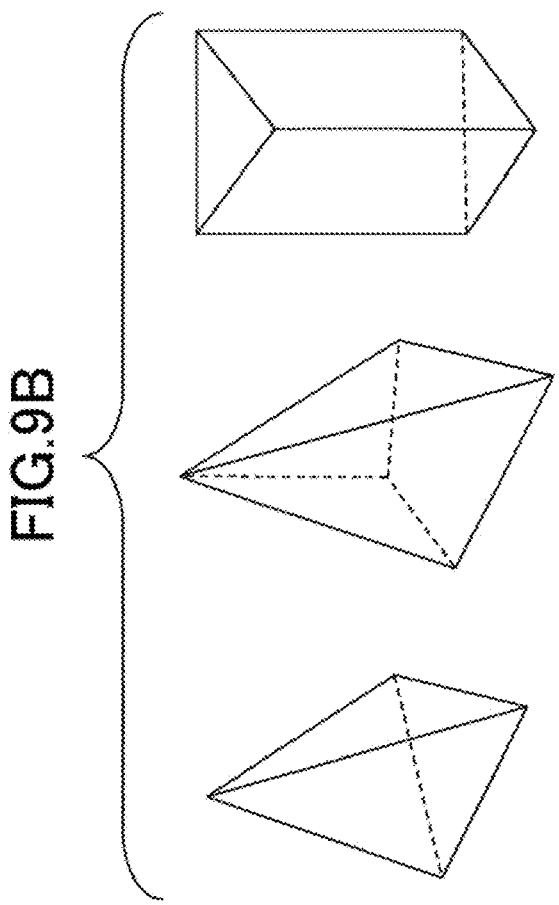
FIG. 9A and FIG. 9B are diagrams illustrating examples of the structural grid and the unstructured grid.
Figure 9A:
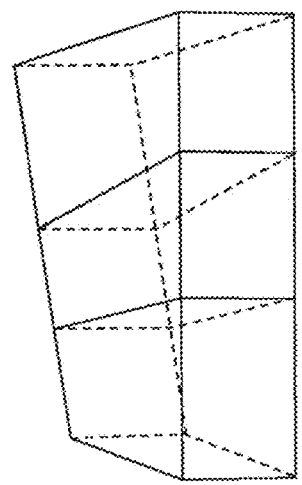

FIG. 9A and FIG. 9B are diagrams illustrating examples of the structural grid and the unstructured grid. FIG. 9A depicts an example of the structural grid. The structural grid is represented by a hexahedron. FIG. 9B depicts an example of the unstructured grid. The unstructured grid is represented by a tetrahedron (a triangular pyramid) or a pentahedron (square pyramid or triangular pyramid).

The space interpolation part 41 includes the entire computational space 7 in the rectangular region, and conducts the space interpolation process by the structural grid. The space interpolation process may be conducted in accordance with a procedure described below.

1) For the unstructured grid, a histogram is automatically acquired based on a length of the edge. That is, if (min, max)=(1.0e−3, 1.0e+2), the unstructured grid is divided by 10 in logarithm.

2) A count value (which may be "a") in a first histogram range and a maximum count value (which may be "b") are introduced into the following formula, $$L = \frac{a * Lmin + b * \max}{(a+b)}. \quad \text{[Formula 1]}$$

As a data structure, both the structural grid and the unstructured grid may be input.

In the space interpolation process of data for the unstructured grid, by using a method for generating the three dimensional structural grid by using a tetrahedral element (Non-Patent Document 2), the interpolation is conducted by a division number indicated by the user. The extraction of the phenomenon region 1 is conducted with little dependence on an interpolation accuracy.

The texture generation part 45 divides the computational space into the phenomenon region 1 and a region other than the phenomenon region 1. An example of using the λ2 method of Jing et al. will be described below. However, the extraction of the phenomenon region 1 is not limited to the λ2 method. In a case of using the λ2 method, a value to output is a λ2 value (a scaler value).

1) A velocity vector (u, v, w) is arranged on the nodal points of the structural grid. In a case of the unstructured grid, the interpolation is conducted for the nodal points on the structural grid.

2) A slope is calculated on the nodal point i from the velocity vector ($u_i$, $v_i$, $w_i$), a matrix J is created by $$J = \begin{pmatrix} u_x & u_y & u_z \\ v_x & v_y & v_z \\ w_x & w_y & w_z \end{pmatrix} \text{ Velocity Tensor.} \quad \text{[Formula 2]}$$

3) Then, $$A = S^2 + Q^2$$

is calculated. Here, S is represented by $$S = \frac{1}{2}(J + J^T) \text{ Rate-of-strain tensor.} \quad \text{[Formula 3]}$$

Q is represented by $$Q = \frac{1}{2}(J - J^T) \text{ Rate-of-rotation tensor} \quad \text{[Formula 4]}$$

4) An eigenvalue of a matrix A is calculated.

5) λ2 is selected. That is, a second value is selected from λ1, λ2, and λ3.

A center line extraction process by the center line extraction part 43 is realized by an existing technology. As an example, a method by Motoi Kinishi et al. may be used. Then, the center line 3 is extracted.

Next, the cross-section formation process and a texture generation process will be described. The cross-section formation process by the cross-section formation part 44 is performed by using the first cross-section formation method and the second cross-section formation method.

Figure 10B:
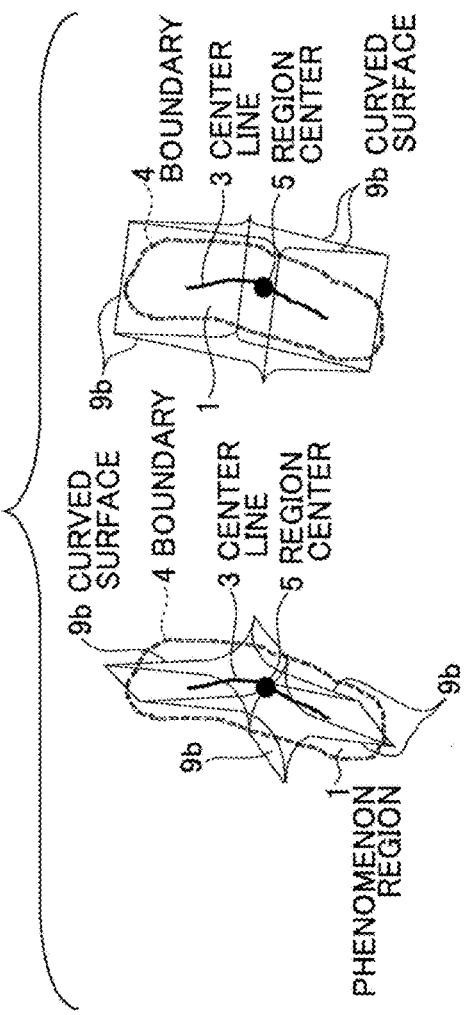
FIG. 10B is a diagram illustrating a cross-section example of the second cross-section formation method.
Figure 10A:
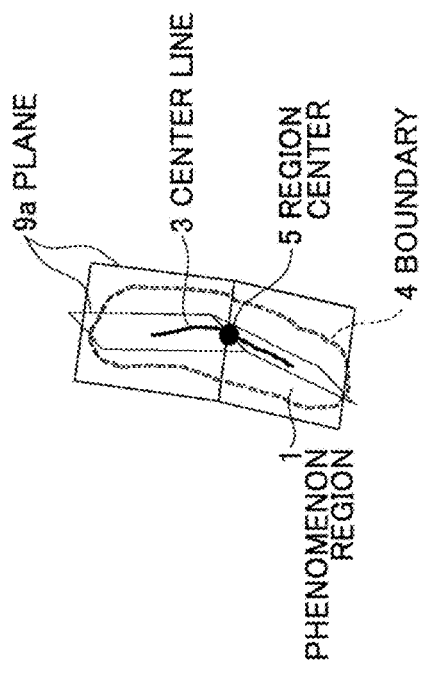
FIG. 10A is a diagram illustrating a cross-section example of a first cross-section formation method.

FIG. 10A is a diagram illustrating a cross-section example of the first cross-section formation method. In FIG. 10A, two planes 9a share the edge including the region center 5 of the phenomenon region 1 with each other. One cross-section is created by these two planes 9a. The one cross-section is represented by a pair of two planes 9a sharing the edge including the region center 5.

FIG. 10B is a diagram illustrating a cross-section example of the second cross-section formation method. In FIG. 10B, by using the middle point information of the rectangular region 6 minimal for the phenomenon region 1, one cross-section is created by two curved surfaces 9b. For each of four surfaces parallel in a longitudinal direction of the rectangular region 6, the two curved surfaces 9b at up and down share, as an edge, a line including each of middle points of two edges facing each other in a lateral direction. The one cross-section is represented by these two curved surfaces 9b.

FIG. 11A through FIG. 11I are diagrams for explaining a process example of the first cross-section formation method. FIG. 11A depicts a state in which the region center 5 of the phenomenon region 1 is defined.

In FIG. 11B, the three dimensional coordinates ($x_a$, $y_a$, $z_a$) and ($x_b$, $y_b$, $z_b$) of both edges 5a and 5b of the center line 3 are acquired. A quadrilateral $9_{a11}$ is defined to include the region center 5 and an edge 5a and a quadrilateral $9_{a12}$ is defined to include the region center 5 and an edge 5b. By the quadrilateral $9_{a11}$ and the quadrilateral $9_{a12}$, a minimum region including the boundary 4 is determined.

Based on the quadrilateral $9_{a11}$ and the quadrilateral $9_{a12}$, a pair of two planes 9a is created so as to share the line including the region center 5 as the edge. By changing the angle θ and creating the plurality of pairs of the planes 9a, n cross-sections are created.

In a simple manner, a maximum value and a minimum value are acquired in each of axis directions of the center line 3, a long axis of a longest distance is selected, and a half distance is acquired to set a center position. The n cross-sections are created by rotating one of two planes by angle θ with respect to an axis connecting two points. One plane (which may be the quadrilateral $9_{a11}$) shares the center position and the edge 5a, and another plane (which may be the quadrilateral $9_{a12}$) shares the center position and the edge 5b.

In FIG. 11C, the quadrilateral $9_{a11}$ including the region center 5 and the edge 5a and the quadrilateral $9_{a12}$ including the region center 5 and the edge 5b are generated.

In FIG. 11D, a line $5\gamma_1$ including the region center 5 is acquired at a position where one plane including the quadrilateral $9_{a11}$ and another plane including the quadrilateral $9_{a12}$ intersect. Then, the pair of the planes 9a is created so that these two planes 9a are connected at the line $5\gamma_1$.

In FIG. 11E, the two planes are rotated by the angle θ with respect to the axis. Similar to FIG. 11C, the quadrilateral $9_{a21}$ including the region center 5 and the edge 5a and the $9$ quadrilateral $_{a22}$ including the region center 5 and the edge 5b are generated.

In FIG. 11F, a line $5\gamma_2$ including the region center 5 is acquired at a position where one plane including the quadrilateral $9_{a21}$ and another plane including the quadrilateral $9_{a22}$ intersect. Then, the pair of the planes 9a is created so that these two planes 9a are connected at the line $5\gamma_2$.

Furthermore, in FIG. 11G, with respect to the line $5\gamma_2$, the plane including the line $5\gamma_1$ and the line $5\gamma_2$ is further rotated by the angle θ, and a quadrilateral $9_{a31}$ including the region center 5 and the edge 5a and a quadrilateral $9_{a32}$ including the region center 5 and the edge 5b are generated.

In FIG. 11H, a line $5\gamma_3$ including the region center 5 is acquired at a position where one plane including the quadrilateral $9_{a31}$ and another plane including the quadrilateral $9_{a32}$ intersect. Then, the pair of the planes 9a is created so that these two planes 9a are connected at the line $5\gamma_3$.

Accordingly, in a case of the angle θ=60°, as depicted in FIG. 11I, three pairs of the planes 9a are defined. That is, cross-sections in six directions are defined.

FIG. 12A through FIG. 12E are diagrams for explaining a process example of the second cross-section formation method. FIG. 12A depicts a state of setting the rectangular region 6, which is spatially minimum for the phenomenon region 1. A surface configuration is formed by using information of the rectangular region 6.

In FIG. 12B, first, with respect to the phenomenon region 1 having an undefined shape, minimum values and maximum values are searched for in x, y, and z axis directions, and a point $e_1$ ($x_{e1}$, $y_{e1}$, $z_{e1}$) and a point $e_2$ ($x_{e2}$, $y_{e2}$, $z_{e2}$) are specified as corners of the rectangular region 6.

Based on a distance between the point $e_1$ and the point $e_2$, a maximum coordinate axis is selected from values of x, y, and z. When the y value indicates a greatest value, a plane $D_1$ is defined at a position of ($y_{e2}-y_{e1}$)/2 to reduce the rectangular region 6 to be ½.

In FIG. 12C, similarly, a plane $D_2$ is defined at a middle position of ($x_{e2}-x_{e1}$)/2 with respect to the x axis to reduce the rectangular region 6 to be ½. A quadratic curve is defined to connect a point $p_1$ ($x_{p1}$, $y_{p1}$, $z_{p1}$) and a point $q_1$ ($x_{q1}$, $y_{q1}$, $z_{q1}$). The point $p_1$ ($x_{p1}$, $y_{p1}$, $z_{p1}$) is a point where the plane $D_2$ intersects with the edge of the rectangular region 6, and the point $q_1$ ($x_{q1}$, $y_{q1}$, $z_{q1}$) is a point where the plane $D_1$ intersects with the edge of the rectangular region 6. Also, a quadratic curve is defined to connect a point $p_1$ ($x_{p1}$, $y_{p1}$, $z_{p1}$) and a point $q_1$ ($x_{q1}$, $y_{q1}$, $z_{q1}$). A point $p_2$ ($x_{p2}$, $y_{p2}$, $z_{p2}$) is a point where the plane $D_2$ intersects with the edge of the rectangular region 6, and a point $q_2$ ($x_{q2}$, $y_{q2}$, $z_{q2}$) is a point where the plane $D_1$ intersects with the edge of the rectangular region 6. Then, a curved surface 9b is created by the quadratic curve connecting the point $p_1$ and the point $q_1$, the quadratic curve connecting the point $p_2$ and the point $q_2$, a line connecting the point $p_1$ and the point $p_2$, and a line connecting the point $q_1$ and the point $q_2$.

In FIG. 12D, similarly, a quadratic curve is defined to connect the point $p_1$ and a point $q_3$, and a quadratic curve is defined to connect the point $p_2$ and a point $q_4$. Then, a curved surface 9b is created by the quadratic curve connecting the point $p_1$ and the point $q_3$, the quadratic curve connecting the point $p_2$ and the point $q_4$, a line connecting the point $p_1$ and the point $p_2$, and a line connecting the point $q_3$ and the point $q_4$. The line connecting the point $p_1$ and the point $p_2$ of the curved surface 9b created in FIG. 12C is a line to be shared.

Moreover, a quadratic curve is defined to connect a point $p_3$ and the point $q_1$, and a quadratic curve is defined to connect a point $p_4$ and the point $q_2$. Then, a curved surface 9b is created by the quadratic curve connecting the point $p_3$ and the point $q_1$, the quadratic curve connecting the point $p_4$ and the point $q_2$, a line connecting the point $p_3$ and the point $p_4$, and a line connecting the point $q_1$ and the point $q_2$.

Furthermore, a curved surface 9b is created, in which a quadratic curve is defined to connecting the point $p_3$ and the point $q_3$, and a quadratic curve is defined to connecting the point $p_4$ and the point $q_4$.

Among four created curved surfaces 9b as described above, adjacent curved surfaces 9b share a line acquired based on the middle point information with each other.

In FIG. 12E, with respect to a z axis, at a middle position ($z_{e2}-z_{e1}$)/2, a plane $D_3$ is defined to reduce the rectangular region 6 to be ½. A quadratic curve is defined to connect a point $r_1$ and the point $q_3$. The point $r_1$ is a point where the plane $D_3$ intersects with the edge of the rectangular region 6, and the point $q_3$ is a point where the plane $D_1$ intersects with the edge of the rectangular region 6. Also, a quadratic curve is defined to connect a point $r_2$ and the point $q_1$. The point $r_2$ is a point where the plane $D_3$ intersects with the edge of the rectangular region 6, and the point $q_1$ is a point where the plane $D_1$ intersects with the edge of the rectangular region 6. Then, a curved surface 9b is created.

In the same manner, a curved surface 9b is created, in which a quadratic curve is defined to connecting the point $r_1$ and the point $q_4$, and a quadratic curve is defined to connecting the point $r_2$ and the point $q_3$.

Moreover, a curved surface 9b is created, in which a quadratic curve is defined to connecting the point $r_3$ and the point $q_3$, and a quadratic curve is defined to connecting the point $r_4$ and the point $q_1$. Furthermore, a curved surface 9b is created, in which a quadratic curve is defined to connecting the point $r_3$ and the point $q_4$, and a quadratic curve is defined to connecting the point $r_4$ and the point $q_2$. In the second cross-section formation method, the cross-section is represented by the pair of two curved surfaces 9b.

Figure 13:
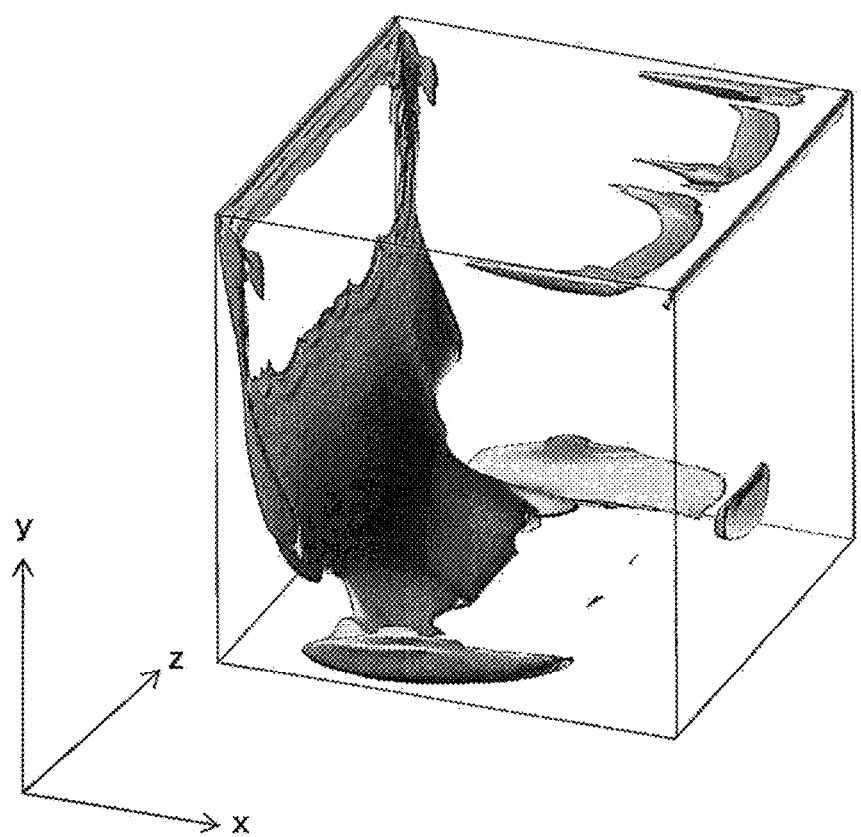
FIG. 13 is a diagram illustrating an example of a process result image.
Figure 14:
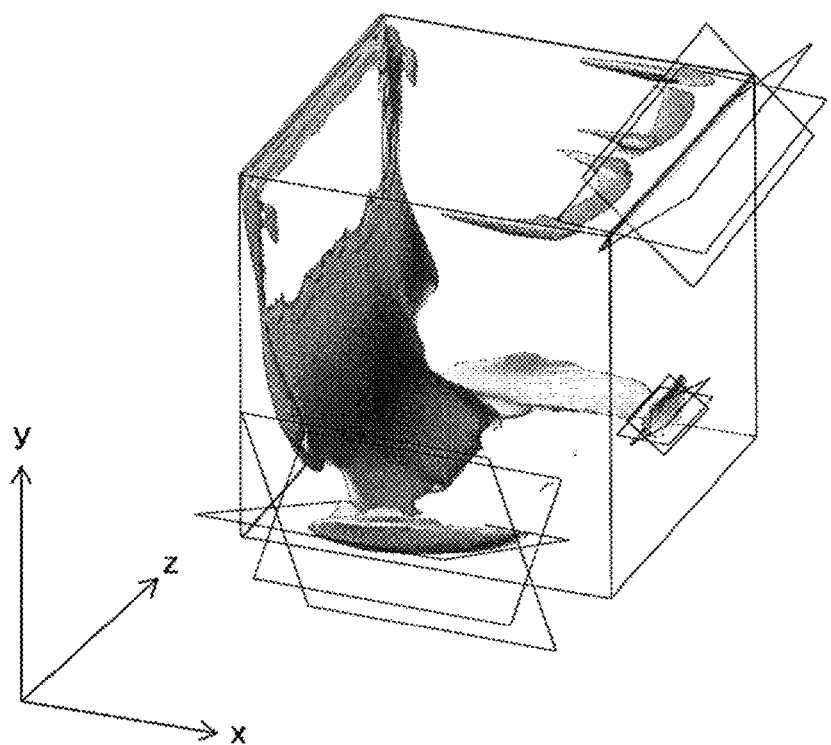
FIG. 14 is a diagram illustrating an example in a case of setting a part of the cross-section with respect to the process result image in FIG. 13.

Display examples of the visualization process in the embodiment will be described with reference to FIG. 13 and FIG. 14. FIG. 13 is a diagram illustrating an example of a process result image. FIG. 14 is a diagram illustrating an example in a case of setting a part of the cross-section with respect to the process result image in FIG. 13.

FIG. 14 depicts an example of a cross-section setting in the first cross-section formation method. In the visualization process in the embodiment as described above, it has been known that it is possible to reduce an amount of data.

Input data are as follows:
simulation result
coordinates of the nodal points, element information, physical values at elements
color map data
parameters of a user indication
the first cross-section formation method or the second cross-section formation method.

In the embodiment, a data amount for the visualization process is represented as follows:

$$n >> m \times 2 \times 5 + \text{texture data amount}$$

where n denotes an original three dimensional polygon number, and it is assumed that a polygon number used on each of the cross-sections is 2, a cross-section number (an average) per object is 5, and an object number is represented by m. In the visualization process in the embodiment, data corresponding to a region of the plane $9a$ or the curved surface $9b$, which corresponds to a minimum region including the phenomenon region 1, are extracted. Hence, it is possible to reduce the data amount to use for the visualization process with respect to a phenomenon in the three dimensions. Compared with an existing technology, which does not use the visualization process of the embodiment, it is possible for the embodiment to reduce the data amount to $\frac{1}{100}$ at maximum.

Accordingly, in the visualization process of a simulation result using three dimensional large scale data of the structural grid and/or the unstructured grid in the embodiment, a data reduction is realized.

As described above, according to the embodiment, it is possible to properly extract sufficient data for the visualization process of the simulation result.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing apparatus, comprising:
a memory; and
a processor coupled to the memory and the processor configured to
acquire a center line in a phenomenon region in a three dimensional space, the phenomenon region being represented by numerical data acquired by numerical simulation;
perform a first cross-section formation process that acquires cross-section shape information of a cross-section of the phenomenon region depending on each of angles by creating a pair of a first plane and a second plane, the pair representing the cross-section of the phenomenon region;
generate and store, in the memory, texture information with respect to the cross-section shape information for each of the angles, the texture information representing a texture of the cross-section in a vicinity of the center line of the phenomenon region;
select the cross-section shape information and the texture information corresponding to a view direction from the memory; and
generate visualization data used to visualize the phenomenon region in a three dimensional image by using the cross-section shape information and the texture information being selected, and display the phenomenon region based on the visualization data on a display part,
the first cross-section formation process includes
connecting the first plane and the second plane at an intersection line where the first plane and the second plane intersect each other, the intersection line including a center point of the center line, the first plane including the center line and one edge of the center line, the second plane including the center point of the center line and another edge of the center line; and
creating and storing, in the memory, the cross-section shape information of the cross-section of the phenomenon region depending on each of angles by, at every predetermined angle,
rotating the first plane with respect to a certain line passing through the center point defined as an axis, and
generating the second plane to be the pair with the first plane in order to represent the cross-section;
the visualization data are display data being reduced while maintaining analysis accuracy of the numerical simulation.

2. The information processing apparatus as claimed in claim 1, wherein the processor is further configured to perform a second cross-section formation process, instead of the first cross-section formation process, upon receiving a selection of the second cross-section formation process, the second cross-section formation process
sets a plurality of cut surfaces equally dividing a rectangle region in each of perpendicular directions with respect to the rectangle region of three dimensions, the rectangle region including a cross-section in the vicinity; and
creates the cross-section shape information by forming a curved surface by using apexes of the plurality of cut surfaces.

3. The information processing apparatus as claimed in claim 2, wherein
the curved surface is created for each of regions equally divided by the cut surfaces at each of surfaces of the rectangular region of the three dimensions; and
each of lines equally dividing the surfaces is formed as a part of the curved surface, and is shared with the curved surface created in another region.

4. A simulator result display method performed by a computer, the method comprising:
acquiring a center line in a phenomenon region in a three dimensional space, the phenomenon region being represented by numerical data acquired by numerical simulation;
performing a cross-section formation process that acquires cross-section shape information of a cross-section of the phenomenon region depending on each of angles by creating a pair of a first plane and a second plane, the pair representing the cross-section of the phenomenon region;
generating and storing, in the memory, texture information with respect to the cross-section shape information for each of the angles, the texture information representing a texture of the cross-section in a vicinity of the center line of the phenomenon region;

selecting the cross-section shape information and the texture information corresponding to a view direction from a memory;

generating visualization data used to visualize the phenomenon region in a three dimensional image by using the cross-section shape information and the texture information being selected; and displaying the phenomenon region based on the visualization data on a display part, the cross-section formation process includes connecting the first plane and the second plane at an intersection line where the first plane and the second plane intersect each other, the intersection line including a center point of the center line, the first plane including the center line and one edge of the center line, the second plane including the center point of the center line and another edge of the center line; and creating and storing, in the memory, the cross-section shape information of the cross-section of the phenomenon region depending on each of angles by, at every predetermined angle, rotating the first plane with respect to a certain line passing through the center point defined as an axis, and generating the second plane to be the pair with the first plane in order to represent the cross-section;

the visualization data are display data being reduced while maintaining analysis accuracy of the numerical simulation.

5. A non-transitory computer-readable recording medium storing therein a simulator result display program that causes a computer to execute a process comprising:

acquiring a center line in a phenomenon region in a three dimensional space, the phenomenon region being represented by numerical data acquired by numerical simulation;

performing a cross-section formation process that acquires cross-section shape information of a cross-section of the phenomenon region depending on each of angles by creating a pair of a first plane and a second plane, the pair representing the cross-section of the phenomenon region;

generating and storing, in the memory, texture information with respect to the cross-section shape information for each of the angles, the texture information representing a texture of the cross-section in a vicinity of the center line of the phenomenon region;

selecting the cross-section shape information and the texture information corresponding to a view direction from a memory;

generating visualization data used to visualize the phenomenon region in a three dimensional image by using the cross-section shape information and the texture information being selected; and displaying the phenomenon region based on the visualization data on a display part, the cross-section formation process includes connecting the first plane and the second plane at an intersection line where the first plane and the second plane intersect each other, the intersection line including a center point of the center line, the first plane including the center line and one edge of the center line, the second plane including the center point of the center line and another edge of the center line; and creating and storing, in the memory, the cross-section shape information of the cross-section of the phenomenon region depending on each of angles by, at every predetermined angle, rotating the first plane with respect to a certain line passing through the center point defined as an axis, and generating the second plane to be the pair with the first plane in order to represent the cross-section;

the visualization data are display data being reduced while maintaining analysis accuracy of the numerical simulation.

* * * * *